United States Patent [19]

Hoffmann

[11] 3,953,234

[45] Apr. 27, 1976

[54] ELECTRODEPOSITION AND ELECTRODISSOLUTION OF ALKALI METALS IN NONAQUEOUS SOLUTION

[75] Inventor: Arthur Kentaro Hoffmann, New Canaan, Conn.

[73] Assignee: American Cyanamid Company, Stamford, Conn.

[22] Filed: Sept. 21, 1967

[21] Appl. No.: 669,373

Related U.S. Application Data

[63] Continuation-in-part of Ser. No. 427,973, Jan. 25, 1965, abandoned, which is a continuation-in-part of Ser. No. 403,659, Oct. 13, 1964, abandoned.

[52] U.S. Cl............................ 136/6 LN; 136/83 R; 136/154; 204/14 N; 204/59 R
[51] Int. Cl.$^2$....................... H01M 6/18; C25C 1/02
[58] Field of Search ................. 42/7, 973; 403/659; 136/6, 83, 154, 155; 204/14 N, 59

[56] References Cited
UNITED STATES PATENTS

| | | | |
|---|---|---|---|
| 2,863,933 | 12/1958 | Minnick et al.......................... | 136/6 |
| 3,185,590 | 5/1965 | Mayer et al............................. | 136/6 |
| 3,197,392 | 7/1965 | Silversmith et al............ | 204/59 QM |
| 3,248,265 | 4/1966 | Herbert.......................... | 136/83 R X |
| 3,361,653 | 1/1968 | Miller............................. | 204/59 UX |

OTHER PUBLICATIONS

"A Low Temperature Sulfur Dioxide Cell," E. Schaschl et al., *J. Electrochem. Soc.*, Vol. 94, No. 9, pp. 299–308.

*Primary Examiner*—Allen B. Curtis
*Attorney, Agent, or Firm*—Charles J. Fickey; Gordon L. Hart

[57] ABSTRACT

Electrodepositing alkali metals from an electrolyte system comprising a mixture of sulfur dioxide, an organic solvent and an electrolyte salt substantially soluble in said sulfur dioxide and the organic solvent in admixture.

28 Claims, No Drawings

ELECTRODEPOSITION AND ELECTRODISSOLUTION OF ALKALI METALS IN NONAQUEOUS SOLUTION

This application is a continuation-in-part of application Ser. No. 427,973, filed Jan. 25, 1965 which was a continuation-in-part of application Ser. No. 403,659 filed Oct. 13, 1964, both now abandoned.

The present invention relates to solvent-electrolyte systems for electrochemical cells. This invention further relates to the electrodeposition or electrodissolution of metals in non-aqueous solution, particularly in primary and secondary electrochemical cells or batteries.

Much interest has been generated in recent years in the development of secondary or reversible storage batteries having a high energy output per unit weight. Portable, high energy density, reversible power supplies are required for powering satellite equipment during dark orbiting cycles. Obviously, such batteries would be useful in any device requiring a high energy, lightweight, reversible power source such as power tools and appliances as well as automobile, ship and airplane electrical systems.

High energy output and low weight requires the use of active materials as the electrodes and in particular active materials having low equivalent weights. The alkali metals qualify in these respects. However, since the alkali metals are generally reactive in electrolyte systems containing water, acids, alcohols, or other proton donating solvents, these liquids must be replaced by solvents incapable of undergoing protolytic reactions with such metals. A continuing problem in the choice of such solvents is the tendency to co-reduction of said solvents during the discharge of alkali metal ions to form the free metal. Thus, it is apparent that not only must the solvent dissolve and promote the electrical conductivity of the electrolyte, but it must also remain substantially chemically inert to the electrodes and electrolyte during storage as well as during operation of the electrochemical system. In like manner, the electrolyte must be chemically inert to the electrodes.

While attempts have been made to electrodeposit alkali metals, so far as is known the high plating efficiencies over a fairly wide range of current densities required for effective electroplating, and particularly at current densities above 25 milliamperes per square centimeter ($ma/cm^2$), have not been successful, especially as a consequence of the co-reduction of solvent mentioned above. For example, it is known that lithium can be electrodeposited with high plating efficiency from a lithium salt dissolved in propylene carbonate. However, the high plating efficiency is limited to current densities of about 25 $ma/cm^2$ or less. See "New Cathode-Anode Couples Using Nonaqueous Electrolytes", *U.S. Aeronautical Systems Division Technical Documentary Report* No. ASD-TDR-62-1 (1962).

Attempts have also been made to electrodeposit potassium and sodium from solutions of their iodides or bromides in sulfur dioxide. In each instance the sulfur dioxide was found to react on standing with the alkali metal salt, probably to form hydrosulfites and then thiosulfate and pyrosulfite decomposition products. Hence, a stable system could not be obtained with these salts nor could the alkali metal be effectively electrodeposited. See *Zeitschrift Fur Electrochemie*, 29, 210 (1923).

Apart from the development of reversible storage battery systems requiring active materials as the electrodes, the discovery of the instant stable solvent-electrolyte systems defines broader areas of utility. For example, in the electrowinning or electroplating of alkali metals the electrodes themselves need not be active materials but may be any electrically conductive material suitable for the purpose such as platinum, carbon, graphite, metal amalgams, and the like. Furthermore, the secondary or reversible cell or battery is inherently a primary system, i.e., it is also a source of e.m.f. and electric current. Thus, the electrodes of the primary cells or batteries may be of the same material as for secondary systems, as described further below. Primary batteries, however, do not require alkali metal ion as the cation of the electrolyte salt since electrodeposition of alkali metal from solution is not involved. The electrochemical reaction is simply the discharge or dissolution of the alkali metal anode or alkali metal-coated anode into solution as alkali metal ions. Nevertheless, whether the system is intended for use in primary and secondary cells and batteries or is simply for electrodeposition of an alkali metal, the electrolyte salt must be chemically inert to the other components of the system, particularly to oxidation by sulfur dioxide, as more fully described hereinbelow.

It is therefore an object of this invention to provide a chemically inert, non-aqueous, solvent-electrolyte system for the electrodeposition and electrodissolution of alkali metals over a wide range of current density.

A further object is to provide an efficient process for the electrodeposition, electrowinning or electroplating of alkali metals over a wide range of current density.

A still further object is to provide solvent-electrolyte-electrode systems for high eneregy, lightweight primary and secondary cells and storage batteries.

These and other objects and advantages will be apparent from the detailed exposition which follows.

In its broadest aspect this invention is the discovery of a solvent-electrolyte system which is not subject to substantial co-reduction during the charging or discharging of electrochemical cells employing said system and which in the charging operation promotes electrodeposition over a wide range of current density. It is essentially the coreduction of solvent with consequent formation of solvent decomposition products which prevents high plating efficiencies in the electrodeposition of alkali metals and the construction of lightweight, high energy, secondary cells or batteries.

Percent plating efficiency is a measure of usefulness of solvent-electrolyte systems in secondary electrochemical cells and is defined as follows:

$$\% \text{ plating efficiency} = \frac{\text{equivalents of alkali metal plated}}{\text{total Faradays passed}} \times 100$$

Plating efficiencies are relative to electrode material, solvent, electrolyte and current density of the electrochemical system. By current density is meant the number of amperes of electricity passed through a system per square centimeter of cathode surface. For effective electroplating, high plating efficiency should be maintained over a fairly wide range of current densities, e.g., from about 10 to 100 $ma/cm^2$ more.

In accordance with the present invention there is provided a solvent-electrolyte solution of mixture for electrochemical cells which promotes the high plating efficiency of sodium and lithium metals, said solution or mixture comprising an electrolyte salt substantially completely dissolved in a mixture of sulfur dioxide and an organic secondary solvent.

Where the application of the electrochemical system is solely for the electrodeposition of alkali metals as distinguished from completed primary or secondary storage battery systems, the electrodes may be of a conductive material which is chemically inert to the solvent-electrolyte solution. Cathode materials would include any of the alkali or alkaline earth metals such as lithium, sodium, calcium and magnesium as well as transition series metals including platinum, copper, nickel, mercury, silver, cadmium, aluminum and the like. Conductive non-metals such as carbon, graphite, silicon, and the like are also useful. It will be apparent also that alloys, amalgams and mixtures of conductive metals and nonmetals may be employed. Ammong such materials are included stainless steel, monel metals, inconel, Hastelloys and the like; compressed metal powder and carbon electrodes, sintered or foamed metal electrodes, and the like. The anode will be constructed of the metal to be deposited, alone or supported on a conducting base such as the aforementioned materials.

For primary and secondary storage battery systems an anode of lithium or sodium alone or over another conductive base material, e.g., lithium supported on nickel or platinum, will be required depending on whether a lithium or sodium system is desired. Cathode materials may vary widely and include materials such as silver chloride or bromide, silver oxide, nickel fluoride, chromic chloride, mercurous chloride, each alone, on a base, or compacted with metal powder or in the form of a paste. Electrodes in the molten state may also be employed where the electrode material has a melting point below the critical temperature of sulfur dioxide, e.g., sodium.

The electrolyte salts which may be employed in the practice of the present invention are limited to those salts which dissolve and dissociate in the sulfur dioxide-secondary solvent mixture to an extent sufficient to provide a useful specific conductivity and which are substantially inert to the electrodes and the sulfur dioxide. Specific conductivity, since it is a function of temperature as well as concentrations of salt and sulfur dioxide, may vary widely. Generally, the specific conductivity should be at least about $5 \times 10^5 \, \Omega^{-1} cm^{-1}$ at 22°C. Such salts are further characterized as salts which are substantially inert to sulfur dioxide and to the electrodes, that is, substantially inert to chemical or physical interaction with sulfur dioxide such as oxidation by sulfur dioxide or coagulation or precipitation by sulfur dioxide, and to chemical reaction with the electrodes, particularly alkali metal electrodes. Thus, salts of weak acids such as alkali metal alkyls would be excluded since such salts would react chemically with sulfur dioxide and thereofre form unstable systems.

For use in secondary cells or batteries and for simple electrodeposition of metals, the cation of the electrolyte salt will be the ion of the metal to be electro-deposited. For high energy, lightweight, secondary cells or batteries the preferred cations will be the alkali metal ions, more particularly sodium and lithium.

For use in primary cells or batteries, however, the cation of the electrolyte salt need not be a metal ion since it is the metal of the anode which loses electrons and goes into solution as metal ions to supply electric current. Thus, the electrolytes for use in primary cells or batteries may be metal salts or salts of non-metal cations such as tetraalkylammonium ions (e.g., tetraethylammonium acetate) and the like.

The cations of metals other than sodium and lithium, such as other alkali metals and the alkaline earth metals, will also be suitable. Such other metals include, for example, potassium, rubidium, cesium, magnesium. calcium, barium, strontium, and the like. Particularly preferred salts for primary cells or batteries are the monovalent alkali metal and tetraalkylammonium salts of the aforementioned anions.

Nonlimiting examples of salts which are substantially inert to, and substantially soluble in, the combination of sulfur dioxide and organic solvent and which provide a useful specific conductivity include metal salts of organic acids such as acetic, benzoic, formic, oleic, oxalic, palmitic, propionic, stearic, succinic, valeric, cinnamic, para toluene sulfonic acid, and the like; metal chlorides, metal bromides, cyanides, cyanates and thiocyanates; metal sulfides, sulfites, selenides and selenates; metal sulfamates, nitrates, dicyanamides and tricyanomethides; metal hexafluoroarsenates, hexafluorophosphates, hexafluorosilicates and monofluoroacetates; potassium, rubidium and cesium chloroaluminate and bromoaluminate; and the like. In the foregoing salts the preferred metal is an alkali metal or alkaline earth metal as exemplified above.

The electrolyte salts may be used singly or in mixtures of two or more in combination with the sulfur dioxide and organic solvent.

The secondary or cosolvents which may be used with the above salts are limited to materials which promote solubility of the electrolyte salts in sulfur dioxide, are stable to other components of the system and contribute to a useful specific conductivity.

Generally, solvents which satisfy these requirements are organic compounds which have electron rich centers, i.e., contain one or more atoms having at least one unshared pair of electrons, and which lack acidic hydrogen atoms. Organic compounds which are electron rich are materials which contain atoms of elements of Groups $III_A$, $IV_A$, $V_A$ and $VI_A$ of the Periodic Table [*Handbook of Chemistry and Physics*, 44th Ed. (1963), pp. 448–449] as, for example, boron, silicon, nitrogen, phosphorus, oxygen and sulfur as well as combinations of these elements. Organic solvent molecules which are difunctional in these elements, i.e., contain two or more of the foregoing elements whether identical or different, are particularly suitable. By "acidic hydrogen atoms" is meant hydrogen atoms directly bonded to atoms of elements, except carbon, of the foregoing Periodic Groups. Thus, examples of excluded radicals would be OH, SH, PH and NH. Hence piperidine would be excluded but N-methylpiperidine would be included as operable. Salts which are strongly basic are not desirable.

The following classes of compounds exemplify the secondary solvents of this invention. These examples are, of course, nonlimiting since it will be immediately obvious that other solvents of these classes are substantially equivalent. Mixtures of two or more of these solvents may likewise by employed.

Trialkyl borates: trimethyl borate, triethyl borate $(C_2H_5O)_3B$, etc.;

Boronic acid esters: dimethylethyl boronate $C_2H_5B(OCH_2H_5)_2$, etc.;

Borinic acid esters: methyldiethyl borinate (C$_2$H$_5$)$_2$BOCH$_3$, etc.;
Tetraalkyl silicates: tetramethyl silicate (CH$_3$O)$_4$Si, etc.
Alkylalkoxyl silanes: methyltrimethoxy silane CH$_3$Si(OCH$_3$)$_3$, etc.;
Nitro alkanes: nitromethane, nitroethane, etc.;
Alkylnitriles: acetonitrile, propionitrile, isobutylronitrile, pivalonitrile, etc.;
Dialkyl amides: dimethylformamide (CH$_3$)$_2$NCHO, diethylformamide, etc.;
Lactams: N-methylpyrrolidinone also described as N-methyl-$\gamma$-butyrolactam, N-methyl-$\beta$-propiolactam, N-methyl-$\alpha$-valerolactam, etc.;
Tetraalkyl ureas: tetramethylurea (CH$_3$)$_2$NCON(CH$_3$)$_2$, etc.;
Acetals: dimethylacetal CH$_3$CH(OCH$_3$)$_2$, etc.
Ketals: 2,2-dimethoxypropane (CH$_3$O)$_2$C(CH$_3$)$_2$, etc.;
Monocarboxylic acid esters: ethylacetate, ethylbutyrate, etc.;
Orthoesters: trimethylorthoformate HC(OCH$_3$), triethylorthoacetate CH$_3$C(OC$_2$H$_5$)$_3$, etc.;
Lactones: $\gamma$-butyrolactone, $\gamma$-valerolactone, etc.;
Dialkyl carbonates: dimethyl carbonate, diethyl carbonate, etc.;
Alkylene carbonates: ethylene carbonate, propylene carbonate, etc.;
Orthocarbonates: tetramethyl orthocarbonate, etc.;
Monoethers: dimethyl ether, diethyl ether, diisopropyl ether, n-butylether, the aliphatic monoethers disclosed as solvents in U.S. Pat. Nos. 2,019,832 and 2,171,867, etc.;
Polyethers: ethylene glycol diethyl ether, diethylene glycol diethyl ether, dimethoxytetraethyleneglycol, 1,2-dimethoxyethane (glyme), the aliphatic polyethers disclosed as solvents in U.S. Pat. Nos. 2,023,793 and 2,171,867, etc.;
Cyclic ethers: tetrohydrofuran, 1,4-dioxane, tetrahydropyran, etc.;
Monocarboxylic acid anhydrides: acetic anhydride, propionic anhydride, etc.;
Dialkyl sulfates: dimethylsulfate, etc.;
Dialkyl sulfites: dimethylsulfite, etc.;
Alkylene sulfites: ethylene sulfite, propylene sulfite, etc.;
Dialkyl sulfinites: dimethylsulfinite, etc.;
Alkyl sulfonates: methylethyl sulfonate C$_2$H$_5$SO$_2$OCH$_3$, etc.;

The relative proportions of sulfur dioxide, electrolyte salt and secondary solvent are a matter of choice depending on the solubility of the components in each other at a given temperature and pressure. Generally, sufficient sulfur dioxide and secondary solvent must be present to dissolve the electrolyte and the relative and total amounts of the solvents and alkali metal salt should be such as to provide a useful specific conductivity. From about 0.01 to 5.0, preferably 0.1 to 2.0, molar solution of the salt relative to the secondary solvent will generally contribute to the requisite solubility and conductivity in combination with the sulfur dioxide. But obviously the concentration may be varied substantially according to the conductivities desired since specific conductivity is a function of temperature as well as concentrations of electrolyte and solvents.

The secondary solvent will preferably be saturated with the sulfur dioxide by bubbling gaseous sulfur dioxide through the secondary solvent. The electrolyte salt is added to the system before or after saturation with sulfur dioxide. By "saturation" is meant the condition of the solvent mixture when sufficient sulfur dioxide is in solution to give a vapor pressure of one atmosphere above the liquid surface of the system at 22°C. However, for a given electrolyte and given secondary solvent, concentrations of sulfur dioxide substantially less than saturation values have been found to contribute to a useful specific conductivity. For example, a lithium chloride-propylene carbonate system can tolerate about one-fourth or less sulfur dioxide below the saturation level while providing a useful level of conductivity. In general, amounts of sulfur dioxide from about 0.2 molar, relative to the secondary organic solvent, up to saturation will be useful.

In addition, it is possible to operate with liquid sulfur dioxide and a minor amount of co-solvent using a pressure in the cell of up to 36 pounds per square inch gauge.

It is apparent therefore that for a given solventelectrolyte solvent-electrolyte the range of concentrations may vary widely, the important conditions being amounts of sulfur dioxide and secondary solvent sufficient to dissolve the electrolyte and sufficient total concentrations of electrolyte, secondary solvent and sulfur dioxide to provide a useful specific conductivity level.

In the construction of the cells or batteries of the invention, a large variety of cell enclosure materials is available, including inert materials such as glass, high density polyethylenes, polypropylenes, polytetrafluoroethylenes or the like. The cell is generally constructed so as to permit maintaining an inert atmosphere within the cell closure while excluding atmospheric moisture, nitrogen and oxygen. Inert gases such as argon, xenon and helium may be used for this purpose. Conventional means are provided for the addition and exit of the desired gases and for the insertion of the electrodes. The electrodes are constructed of the conductive materials noted above. In a typical embodiment, the anode is inserted as a coil, plate or sheet of metal or it may be a bed for a saturated metal amalgam.

The solvent-electrolyte systems of the present invention are totally unexpected discoveries since liquid sulfur dioxide when used alone is discharged, i.e., reduced or decomposed, at low voltages at metal electrode surfaces such as mercury, platinum and nickel over a wide range of current density. Hence, it is not predictable that lithium or sodium ions would be reduced, without substantial discharge of sulfur dioxide and secondary solvent, at potentials which far exceed, i.e., are more negative than, the reduction potential ordinarily observed at discharge of sulfur dioxide.

While the underlying reasons for the foregoing behavior and the unexpectedly high % plating efficiencies of the systems of this invention are not precisely known, it is thought that two factors are primarily responsible. The first is that sulfur dioxide in combination with the secondary organic cosolvents markedly raises the solubility and conductivity of the electrolyte salts. This reduces mass transfer limitations at the electrodes, permitting, in turn, higher current densities for plating or stripping than otherwise attainable.

The wide acceptance of sulfur dioxide as an excellent ionizing solvent for alkali metal salts is not always borne out in fact. Thus many alkali metal salts soluble in liquid sulfur dioxide, such as lithium fluoride, do not ionize measurably and give solutions with resistances too high for plating. However, such salts, as well as salts which are essentially insoluble and nonconducting or poorly conducting, form highly conducting solutions in sulfur dioxide admixed with the secondary solvents disclosed herein. As a reason for this it is believed that since sulfur dioxide is an electron acceptor and forms charge transfer complexes, the electrolyte salt anions are more easily solvated by sulfur dioxide than by the cations. But the secondary organic cosolvents disclosed herein are electron rich, i.e., contain atoms such as nitrogen or oxygen having unshared electron pairs, and therefore tend to solvate cations rather than anions. Hence the mixed sulfur dioxide-secondary solvent system appears to function as a single bifunctional solvent capable of solvating both anions and cations and therefore serves to substantially improve the conductivity of the alkali metal salt solution. It will also be evident that the alkali metal salts of this invention, which have low ionic lattice energies and therefore low melting points, more readily dissociate in sulfur dioxide and thereby promote formation of the charge-transfer complexes. These interactions now make it possible to employ solvents, e.g., ethylene carbonate and glyme, which heretofore had poor solvent power for alkali metal salts, for the production of high % plating efficiencies over a wide range of current density.

The second factor, thought to be responsible for the high % plating efficiencies of the compositions of this invention, is what may be described as "surface passivation".

Heretofore many solvents were beyond consideration for alkali metal salt electrochemical systems because of chemical reactivity with the alkali metal either during plating or upon discharge of a cell, i.e., oxidation of a lithium metal-plated electrode. Now it has been discovered that such chemical reactivity is substantially eliminated when such solvents are used in conjunction with sulfur dioxide. This is difficult to explain since sulfur dioxide when used alone is easily reduced at a potential far less, i.e., less negative, than the potential at which plating is permitted when sulfur dioxide is combined with the secondary solvent. This anomaly appears to be best understood by the formation of a surface coating of uncharged sulfur dioxide and sulfur dioxide anion radicals on the metal electrode surface which prevents the relatively larger organic solvent molecules from approaching the metal surface sufficiently close to become reduced. The electrode surface may than be said to be "passivated" with respect to the solvent molecules. In addition, it would appear that the sulfur dioxide-containing solvent is unable to solvate such sulfate dioxide anion radicals thereby rendering the diffusion of the latter species from the electrode surface such a high energy process as to be energetically unfeasible.

In order that the present invention may be more completely understood, the following examples are given in which all parts are parts by weight unless otherwise specified. These examples are set forth primarily for the purpose of illustration and any specific enumeration of detail contained therein should not be interpreted as a limitation on the case except where indicated in the appended claims.

EXAMPLE 1

For measurement of plating efficiency a conventional cylindrical glass electrochemical cell was constructed. The cell had a top closure permitting the contents of the cell to be maintained under an argon or other convenient inert atmosphere while excluding atmospheric moisture, nitrogen and oxygen. Provision is also made for the addition and exit of desired gases and for insertion of a cathode and leads to the anode and to a third probe reference electrode (a standard calomel electrode).

Plating was carried out under controlled current density at the electrodes whereby the total number of Faradays passed through the cell was known for a given period of time. The amount of metal electrodeposited was determined by removing the cathode and placing it in a calibrated eudiometer tube and measuring the amount of hydrogen gas evolved when the cathode is contacted with water. Percent plating efficiency is defined as follows:

$$\% \text{ Plating Efficiency} = \frac{\text{equivalents of alkali metal plated}}{\text{total Faradays passed}} \times 100$$

A 1.0 molar solution of lithium perchlorate in dimethyl sulfite (specific conductivity of this solution: $6.6 \times 10^{-3} \, \Omega^{-1} \text{cm}^{-1}$ at 22°C.) was electrolyzed under the conditions and with the plating efficiencies set forth in Table I. The Table shows the substantially improved plating efficiencies over a wide range of current density when the dimethyl sulfite is saturated at room temperature and atmospheric pressure with sulfuric dioxide (specific conductivity of solution: $1.1 \times 10^{-2} \, \Omega^{-1} \text{cm}^{-1}$ at 22°C.). Saturation with $SO_2$ was effected by bubbling the gas through the electrolytic solution.

TABLE I

|  | Dimethyl sulfite[1] | | | | | Dimethyl sulfite saturated with $SO_2$[2] | | |
|---|---|---|---|---|---|---|---|---|
| Current density (ma/cm²) | 2.5 | 10 | 25 | 50 | 100 | 25 | 50 | 100 |
| Reduction Potential (volts)[3] | −3.5 | −3.5 | −4.2 | −4.8 | −6.7 | −3.5 | −4.1 | −5.0 |
| Rest potential of Li-plated cathode (volts)[3] | −3.3 | −3.3 | −3.4 | −3.4 | −3.6 | −3.1 | −3.1 | −3.1 |
| % Plating Efficiency | 44.9 | 53.1 | 53.9 | 64.2 | 69.8 | 90 | 93 | 95 |

[1] Anode was lithium amalgam bed.
[2] Anode was lithium metal ribbon. Cathode in each case was nickel metal, 1 cm².
[3] All potentials in this and succeeding examples are referred to a standard calomel reference electrode and the sign convention is that adopted by the International Union of Pure and Applied Chemistry as described in Potter, Electrochemistry-Principles & Applications, pages 85–87 (1961).

EXAMPLE 2

Table II summarizes results for electrolysis of 1.0 molar solution of $LiClO_4$ in acetonitrile. The acetonitrile was previously saturated with $SO_2$ at room temperature and atmospheric pressure. The anode was lithium metal ribbon and the cathode was nickel, 1 cm². In the absence of $SO_2$ the system evolved gas and no lithium was deposited. The apparatus and procedure were essentially the same as in Example 1.

TABLE II

| Current density (ma/cm²) | 10 | 25 | 50 | 100 |
|---|---|---|---|---|
| Reduction potential (volts) | −3.2 | −3.4 | −3.6 | −4.1 |
| Rest potential of cathode (volts) | −3.1 | −3.1 | −3.1 | −3.1 |
| % Plating Efficiency | 91.4 | 93.3 | 94.6 | 94.0 |

EXAMPLE 3

Plating efficiencies were measured in essentially the same manner as in the foregoing examples for the electrolysis of 1.0 molar $LiClO_4$ in propylene carbonate. The solvent was previously saturated with $SO_2$ at room temperature and atmospheric pressure. Anode and cathode were the same as in Example 2. Table III summarizes the results. Without $SO_2$ plating efficiencies dropped sharply at current densities over 25 ma/cm².

TABLE III

| Current density (ma/cm²) | 25 | 100 |
|---|---|---|
| Reduction potential (volts) | −4.7 | |
| Rest potential of cathode (volts) | −3.1 | −3.1 |
| % Plating Efficiency | 96.2, 98.5 | 72 |

EXAMPLE 4

Lithium was plated from 0.8 molar lithium chloride in propylene carbonate, which was saturated with $SO_2$, in essentially the same manner as Example 2 with the following results. Specific conductivity of the $SO_2$-saturated propylene carbonate was $1.2 \times 10^{-2}$ $\Omega^{-1}cm^{-1}$, at half-saturation $6.5 \times 10^{-3}$ $\Omega^{-1}cm^{-1}$ and at quarter-saturation $4.8 \times 10^{-3}$ $\Omega^{-1}cm^{-1}$, each measured at room temperature (22°C.).

TABLE IV

| Current density (ma/cm²) | 5 | 10 | 25 |
|---|---|---|---|
| Reduction potential (volts) | −3.6 | −3.8 | −4.1 |
| Rest potential of cathode (volts) | −3.1 | −3.1 | −3.1 |
| % Plating Efficiency | 84.4, 77.2 | 96.6, 97.2 | 89.7 |

EXAMPLE 5

Table V reports the results of lithium plating from 1.0 molar LiCl in ethylene carbonate which was saturated with $SO_2$ (specific conductivity of solution: $1.3 \times 10^{-2}$ $\Omega^{-1}cm^{-1}$ at saturation and $9.8 \times 10^{-3}$ $\Omega^{-1}cm^{-1}$ at half-saturation, each at 22°C.). The anode and cathode were lithium metal and nickel (1 cm²), respectively.

TABLE V

| Current density (ma/cm²) | 10 | 25 | 50 | 100 |
|---|---|---|---|---|
| Reduction potential (volts) | −3.3 | −3.5 | −4.3 | −5.1 |
| Rest potential of cathode (volts) | −3.0 | −3.0 | −3.0 | −3.0 |
| % Plating Efficiency | 92.7 | 95.3 | 96.6 | 96.0 |

EXAMPLE 6

The increase in specific conductivity as the $SO_2$ content is varied in an LiCl-propylene carbonate system is demonstrated in the following Table. It will be seen from the Table that the conductivity is about doubled when propylene carbonate is quarter-saturated with $SO_2$, very little change occurs when the half-saturation level is reached, but specific conductivity is again about doubled when the saturation level is reached. Solubility of LiCl in propylene carbonate is also substantially improved. Synergy is evident in the coaction of the $SO_2$ and secondary solvent since the conductivity at quarter-saturation with $SO_2$ is almost 20 times the sum of the conductivities measured for the solvents used alone.

TABLE VI

| Solvent | Amount LiCl dissolved | Specific Conductivity |
|---|---|---|
| $SO_2$ alone | Insoluble at −10°C | Too low to read |
| Propylene carbonate, $SO_2$ -saturated¹, | 1.0 molar | $1.2 \times 10^{-2} \Omega^{-1}cm^{-1}$ |
| Propylene carbonate, $SO_2$ -half saturated | ca. 0.3–0.5 molar | $6.5 \times 10^{-3} \Omega^{-1}cm^{-1}$ |
| Propylene carbonate, $SO_2$ -quarter saturated | ca. 0.5 molar | $4.8 \times 10^{-3} \Omega^{-1}cm^{-1}$ |
| Propylene carbonate alone | 0.3 molar (saturated) | $2.8 \times 10^{-4} \Omega^{-1}cm^{-1}$ |

¹Solubility of $SO_2$ in propylene carbonate is 457 g./l. at 22°C.

EXAMPLES 7 and 8

In substantially the same manner as in the foregoing examples lithium bromide, lithium thiocyanate, LiSCN, lithium hexafluorophosphate, $LiPF_6$, lithium hexafluoroarsenate, $LiAsF_6$, lithium hexafluorosilicate, $Li_2SiF_6$, lithium dicyanamide, $LiN(CN)_2$, and lithium tricyanomethide, $LiC(CN)_3$, each in $SO_2$-saturated solution with one or more of dimethyl sulfite, ethylene carbonate, propylene carbonate, dimethyl carbonate, ethylene sulfite and acetonitrile are electrolyzed to give high % lithium Plating Efficiencies over a wide range of current density. The corresponding sodium salts of the electrolytes of Examples 1–8 may also be employed to obtain substantially the same high % sodium Plating Efficiencies.

EXAMPLE 9

In order to demonstrate the reversibility of a completed battery utilizing the solvent-electrolyte systems of the present invention, a cell substantially similar to that of Example 1 is constructed except that the anode is lithium metal ribbon, the cathode is silver-silver chloride and the solvent-electrolyte system is propylene carbonate saturated with sulfur dioxide and containing excess lithium chloride electrolyte. The open circuit voltage measured on discharge of this system is 2.9 volts.

The same battery system is then constructed in a totally discharged state employing a nickel cathode upon which lithium is plated during the charging process. After electrolysis (charging) the open circuit voltage is 2.9 volts.

I claim:

1. An anhydrous liquid electrolyte solution in an electrochemical cell which solution comprises an electrolyte salt dissolved in a mixed liquid solvent which consists essentially of sulfur dioxide and at least one organic compound having no acidic hydrogen atoms and containing an element having at least one unshared electron pair, said electrolyte solution having specific conductivity of at least $10^{-3} \text{ohm}^{-1}\text{cm}^{-1}$ at 22°C. and substantially higher than the specific conductivity of solutions having the same components but absent either the sulfur dioxide or the secondary solvent components.

2. An electrolyte solution in an electrochemical cell as defined by claim 1 which comprises a liquid mixture of sulfur dioxide, lithium perchlorate and dimethyl sulfite.

3. An electrolyte solution in an electrochemical cell as defined by claim 1 wherein said organic secondary solvent comprises acetonitrile and said salt comprises lithium perchlorate.

4. An electrolyte solution in an electrochemical cell as defined by claim 1 which comprises a mixture of sulfur dioxide, lithium perchlorate and propylene carbonate.

5. An electrolyte solution in an electrochemical cell as defined by claim 1 which comprises a mixture of sulfur dioxide, lithium chloride and propylene carbonate.

6. An electrolyte solution in an electrochemical cell as defined by claim 1 which comprises a mixture of sulfur dioxide, lithium chloride and ethylene carbonate.

7. A process which comprises the electrodeposition of metals from an electrolyte solution defined by claim 1.

8. A process which comprises the electrodeposition of lithium metal from an electrolyte solution defined by claim 1 wherein the defined electrolyte salt is a lithium salt.

9. A process which comprises electrodepositing lithium metal from an electrolyte solution defined by claim 4.

10. A process which comprises electrodepositing lithium metal from an electrolyte solution defined by claim 5.

11. An electrochemical cell which comprises an anode and a cathode immersed in an electrolyte solution defined by claim 1.

12. A reversible electrochemical cell comprising a nickel anode and a silver-silver chloride cathode, said anode and cathode being immersed in a liquid electrolyte solution defined by claim 4.

13. An anhydrous electrolyte solution defined by claim 1 wherein said electrolyte solution comprises a charge transfer complex formed in said solution by the anion of said electrolyte salt and sulfur dioxide in said solution.

14. An electrochemical cell comprising an alkali metal anode, an electroconductive cathode, and contacting said anode and said cathode in said cell, an electrolyte solution defined by claim 13.

15. An electrochemical cell comprising an alkali metal anode, an electroconductive cathode, and, contacting said anode and said cathode in said cell, an electrolyte solution defined by claim 1.

16. An electrochemical cell defined by claim 15 and further defined as being an electrochemical energy source cell.

17. An electrochemical cell defined by claim 16 and further defined as being an electrochemical energy source cell.

18. An electrochemical cell defined by claim 15 wherein said alkali metal anode is lithium.

19. An electrochemical cell defined by claim 15 wherein said anode metal is lithium and said electrolyte salt is a lithium salt.

20. An electrochemical energy source cell comprising a lithium anode, an electroconductive cathode, and contacting said anode and said cathode in said cell an electrolyte solution defined by claim 1 wherein the defined organic liquid cosolvent comprises propylene carbonate and the defined electrolyte salt comprises a lithium salt.

21. An electrochemical energy source cell comprising an anode and a cathode and an anhydrous liquid electrolyte solution in contact with said anode and cathode, said electrolyte solution comprising a liquid electrolyte solvent which consists essentially of at least one-fourth the saturation amount of sulfur dioxide and at least one organic compound having no acidic hydrogen atom and containing an element having at least one unshared electron pair, and an electrolyte salt dissolved in the defined solvent.

22. A cell defined by claim 21 having an atmosphere comprising inert gas and exclusive of water, nitrogen and oxygen within the cell closure.

23. A cell defined by claim 21 wherein said anode comprises lithium.

24. A cell defined by claim 21 wherein said liquid solvent comprises propylene carbonate.

25. A cell defined by claim 23 wherein said liquid solvent comprises propylene carbonate.

26. In a non-aqueous electrochemical electric current-producing cell involving an anode and a cathode and an electrolyte in contact with said anode and cathode in which the solvent is an anhydrous organic liquid, the improvement which comprises a gaseous compound, different from said electrolyte solvent in said electrolyte as a complex coupling the electrolyte solute of said electrolyte and said solvent, wherein said gaseous compound is sulfur dioxide.

27. In a non-aqueous electrochemical electric current-producing cell involving an anode and a cathode and an electrolyte in contact with said anode and cathode in which the solvent is an anhydrous organic liquid, the improvement which comprises a gaseous compound, different from said electrolyte solvent in said electrolyte as a complex coupling the electrolyte solute of said electrolyte and said solvent, wherein said gaseous compound is sulfur dioxide, and wherein said organic liquid solvent is a sulfur-containing compound.

28. In a non-aqueous electrochemical electric current-producing cell involving an anode and a cathode and an electrolyte in contact with said anode and cathode in which the solvent is propylene carbonate, the improvement which comprises sulfur dioxide in said electrolyte as a complex coupling the electrolyte solute of said electrolyte and said solvent.

* * * * *

UNITED STATES PATENT OFFICE
CERTIFICATE OF CORRECTION

Patent No. 3,953,234                             Dated April 27, 1976

Inventor(s) ARTHUR KENTARO HOFFMANN

It is certified that error appears in the above-identified patent and that said Letters Patent are hereby corrected as shown below:

Column 2, line 67, delete the word "of" and substitute the word -- or -- .

Column 4, line 64, delete the word "by" and substitute the word -- be -- .

Column 12, line 8, delete the number "16" and substitute the number -- 14 -- .

Signed and Sealed this

Twenty-seventh Day of July 1976

[SEAL]

Attest:

RUTH C. MASON
*Attesting Officer*

C. MARSHALL DANN
*Commissioner of Patents and Trademarks*